US012683497B2

(12) United States Patent
Boomer et al.

(10) Patent No.: US 12,683,497 B2
(45) Date of Patent: Jul. 14, 2026

(54) POWER CONVERTER CIRCUITRY

(71) Applicant: Cirrus Logic International Semiconductor Ltd., Edinburgh (GB)

(72) Inventors: Alastair M. Boomer, Edinburgh (GB); John B. Bowlerwell, Dunfermline (GB); James Munger, Austin, TX (US); Andrew J. Howlett, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 254 days.

(21) Appl. No.: 18/299,969

(22) Filed: Apr. 13, 2023

(65) Prior Publication Data

US 2023/0344351 A1      Oct. 26, 2023

Related U.S. Application Data

(60) Provisional application No. 63/332,727, filed on Apr. 20, 2022.

(30) Foreign Application Priority Data

Jun. 20, 2022 (GB) ...................................... 2209062

(51) Int. Cl.
*H02M 3/158* (2006.01)
*H02M 1/00* (2007.01)
(52) U.S. Cl.
CPC ....... *H02M 3/1582* (2013.01); *H02M 1/0009* (2021.05); *H02M 1/0019* (2021.05)
(58) Field of Classification Search
CPC . H02M 1/0009; H02M 1/0019; H02M 3/1582

USPC ......................................................... 323/259
See application file for complete search history.

(56) References Cited

U.S. PATENT DOCUMENTS

| | | | | |
|---|---|---|---|---|
| 5,587,866 | A * | 12/1996 | Yach ..................... | H03K 17/145 |
| | | | | 361/115 |
| 6,198,639 | B1 | 3/2001 | Wolfgart et al. | |
| 7,855,539 | B1 * | 12/2010 | Wong ..................... | H02M 3/156 |
| | | | | 323/283 |
| 12,204,358 | B2 * | 1/2025 | Mitev ..................... | G05F 1/563 |
| 2003/0071793 | A1 * | 4/2003 | Carpenter ............... | G06F 3/045 |
| | | | | 345/173 |

(Continued)

OTHER PUBLICATIONS

Combined Search and Examination Report under Sections 17 and 18(3), UKIPO, Application No. GB2209062.5, mailed Dec. 8, 2022.

*Primary Examiner* — Thienvu V Tran
*Assistant Examiner* — Lauren Ashley Shaw
(74) *Attorney, Agent, or Firm* — Jackson Walker L.L.P.

(57) ABSTRACT

The present disclosure relates to power converter circuitry, and in particular to power converter circuitry for providing a supply voltage to a load such as amplifier circuitry. In one aspect the invention provides a system comprising: amplifier circuitry; and power converter circuitry for receiving a supply voltage and providing an output voltage to the amplifier circuitry, the power converter circuitry comprising: a control loop for regulating an output voltage of the power converter circuitry in accordance with a target output voltage value; and controller circuitry configured to adjust the target output voltage value if the supply voltage to the power converter circuitry is within a first predefined threshold of a requested output voltage of the power converter circuitry.

20 Claims, 6 Drawing Sheets

(56) References Cited

U.S. PATENT DOCUMENTS

| | | | |
|---|---|---|---|
| 2005/0052222 A1 | 3/2005 | Ootani et al. | |
| 2012/0153919 A1* | 6/2012 | Garbossa | H02M 3/156 |
| | | | 323/284 |
| 2013/0234683 A1 | 9/2013 | Knorpp et al. | |
| 2021/0126528 A1* | 4/2021 | King | H02J 7/00714 |
| 2022/0037910 A1* | 2/2022 | Tikhonski | H02J 7/0032 |

* cited by examiner

POWER CONVERTER CIRCUITRY

FIELD OF THE INVENTION

The present disclosure relates to power converter circuitry, and in particular to power converter circuitry for providing a supply voltage to a load such as amplifier circuitry.

BACKGROUND

Portable electronic devices such as mobile phones, laptop and tablet computers, smartwatches etc. typically include a power source such as an on-board battery to power the various components and subsystems of the portable electronic device.

Some components or subsystems of a portable electronic device may require a supply voltage that is greater than the output voltage of the on-board battery. For example, in order to provide a desired output signal amplitude range for driving an output transducer (e.g. loudspeaker that is used to output sound such as music, speech and the like, a haptic transducer such as a resonant actuator, or an ultrasonic transducer) an amplifier subsystem may require a supply voltage that is greater than the maximum output voltage of the on-board battery.

Thus, a boost converter may be provided in such devices, to convert the output voltage of the on-board battery to a higher voltage that is suitable for use as a supply for such components and subsystems. A boost converter is sometimes referred to as a step-up converter in the art since it "steps up" the source voltage.

FIG. 1 shows a simplified schematic representation of example boost converter circuitry and a graph illustrating current flowing through an inductor of the boost converter circuitry in operation of the boost converter circuitry in a continuous conduction mode of operation.

The boost converter circuitry (shown generally at 100 in FIG. 1) essentially includes an inductor 110, a reservoir capacitor 120, a first controllable switch device 130 (which in this example is an n-channel MOSFET), a second controllable switch device 140 (which in this example is a p-channel MOSFET), and control circuitry 150 for controlling the operation of the first and second controllable switch devices (referred to hereinafter simply as switches) 130, 140.

The inductor 110 is coupled in series between a positive terminal of a battery 160 or other power source of a host device (e.g. a mobile phone or the like) and a drain terminal of the first switch 130. A source terminal of the first switch 130 is coupled to a ground or other reference voltage supply rail (hereinafter referred to as ground, for simplicity), and a gate terminal of the first switch 130 is coupled to a first output of the control circuitry 150 so as to receive a control signal from the control circuitry 150.

A drain terminal of the second switch 140 is coupled to the inductor 110 and a source terminal of the second switch 140 is coupled to a first terminal of the reservoir capacitor 120. A gate terminal of the second switch 140 is coupled to a second output of the control circuitry 150 so as to receive a control signal from the control circuitry 150. The second terminal of the reservoir capacitor 120 is coupled to ground.

In operation of the boost converter circuitry 100, the first and second switches 130, 140 are controlled so as to repeatedly couple one terminal of the inductor 110 to ground and then to the reservoir capacitor 120, such that energy can be transferred from the inductor 110 to the reservoir capacitor 120 to increase an output voltage $V_{OUT}$ across the reservoir capacitor 120 to a level that is greater than an output voltage $V_{SUPPLY}$ of the battery 160.

In a first, charging, phase $\phi_1$ of operation of the circuitry 100, the control circuitry 150 outputs control signals to the first and second switches 130, 140 to switch the first switch 130 on, and to switch the second switch 140 off. Thus, during a first time period between a first time to and a second time $t_1$, a current path exists from the battery 160 to ground through the inductor 110, and an increasing current $I_L$ flows through the inductor 110, as shown in the graph of FIG. 1. As a result of the increasing inductor current $I_L$, the inductor stores some energy by generating a magnetic field.

In a second, discharging, phase $\Phi_2$, of operation of the circuitry 100, the control circuitry 150 outputs control signals to the first and second switches 130, 140 to switch the first switch 130 off, and to switch the second switch 140 on. Thus, during a second time period between the second time $t_1$ and a third time $t_2$, current can no longer flow through the inductor 110 to ground through the first switch 130. The current in the inductor 110 must keep flowing, and therefore flows into the reservoir capacitor 120, causing the voltage $V_{OUT}$ across the reservoir capacitor 120 to increase. If $V_{OUT}$ is smaller than $V_{SUPPLY}$ the current in the inductor 110 will continue to increase, hence charging the reservoir capacitor 120. If $V_{OUT}$ is greater than $V_{SUPPLY}$ the current in the inductor 110 will start decreasing, but because the current is still positive the voltage $V_{OUT}$ across the reservoir capacitor 120 will continue to increase further.

By repeating the charging phase $\phi_1$ and the discharging phase $\phi_2$ a number of times, the reservoir capacitor 120 can be charged to a level at which the voltage $V_{OUT}$ across the reservoir capacitor 120 is greater than the voltage $V_{SUPPLY}$ output by the battery 160 and is thus suitable for supplying downstream components or subsystems such as amplifier circuitry or the like that require a greater voltage than can be provided by the battery 160 alone.

SUMMARY

According to a first aspect, the invention provides a system comprising:

amplifier circuitry; and power converter circuitry for receiving a supply voltage and providing an output voltage to the amplifier circuitry, the power converter circuitry comprising:

a control loop for regulating an output voltage of the power converter circuitry in accordance with a target output voltage value; and controller circuitry configured to adjust the target output voltage value if the supply voltage to the power converter circuitry is within a first predefined threshold of a requested output voltage of the power converter circuitry.

The controller circuitry may be configured to compare an indication of the requested output voltage to an indication of the supply voltage to determine if the supply voltage is within the first predefined threshold of the requested output voltage value.

The indication of the supply voltage may comprise a scaled version of the supply voltage.

The controller circuitry may be configured to select the scaled version of the supply voltage as the target output voltage value if the supply voltage to the power converter circuitry is within the first predefined threshold of the requested output voltage for the power converter circuitry.

The power converter circuitry may be operable in a bypass mode in which a power source of the power converter circuitry is directly coupled to an output of the power converter circuitry.

The power converter circuitry may be configured to operate in the bypass mode if the supply voltage is greater than a first threshold.

The first threshold may be based on the requested output voltage and a predefined margin.

The power converter circuitry may be configured to revert to operation in a non-bypass mode if the supply voltage is equal to or less than a second threshold, wherein the second threshold is lower than the first threshold.

The second threshold may be equal to the requested output voltage.

The predefined threshold may comprise a fraction or percentage of the supply voltage.

The predefined threshold may be based on a target boost ratio value of the power converter circuitry.

The power converter circuitry may comprise boost converter circuitry.

The boost converter circuitry may be subject to a minimum duty cycle or a minimum boost ratio requirement.

According to a second aspect, the invention provides power converter circuitry comprising:

a control loop for regulating an output voltage of the power converter circuitry, wherein the control loop comprises controller circuitry configured to enforce a minimum boost ratio if a supply voltage to the power converter circuitry is within a first predefined threshold of a requested output voltage of the power converter circuitry.

According to a third aspect, the invention provides power converter circuitry comprising:

a control loop for regulating an output voltage of the power converter circuitry in accordance with a target output voltage value; and controller circuitry configured to adjust the target output voltage value if a supply voltage to the power converter circuitry is within a first predefined threshold of a requested output voltage of the power converter circuitry.

According to a fourth aspect, the invention provides an integrated circuit comprising a system according to the first aspect or power converter circuitry according to the second or third aspect.

According to a fifth aspect, the invention provides a host device comprising a system according to the first aspect or power converter circuitry according to the second or third aspect.

The host device may comprise a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

BRIEF DESCRIPTION OF THE DRAWINGS

Embodiments of the invention will now be described, strictly by way of example only, with reference to the accompanying drawings, of which.

DETAILED DESCRIPTION

Figure 1:
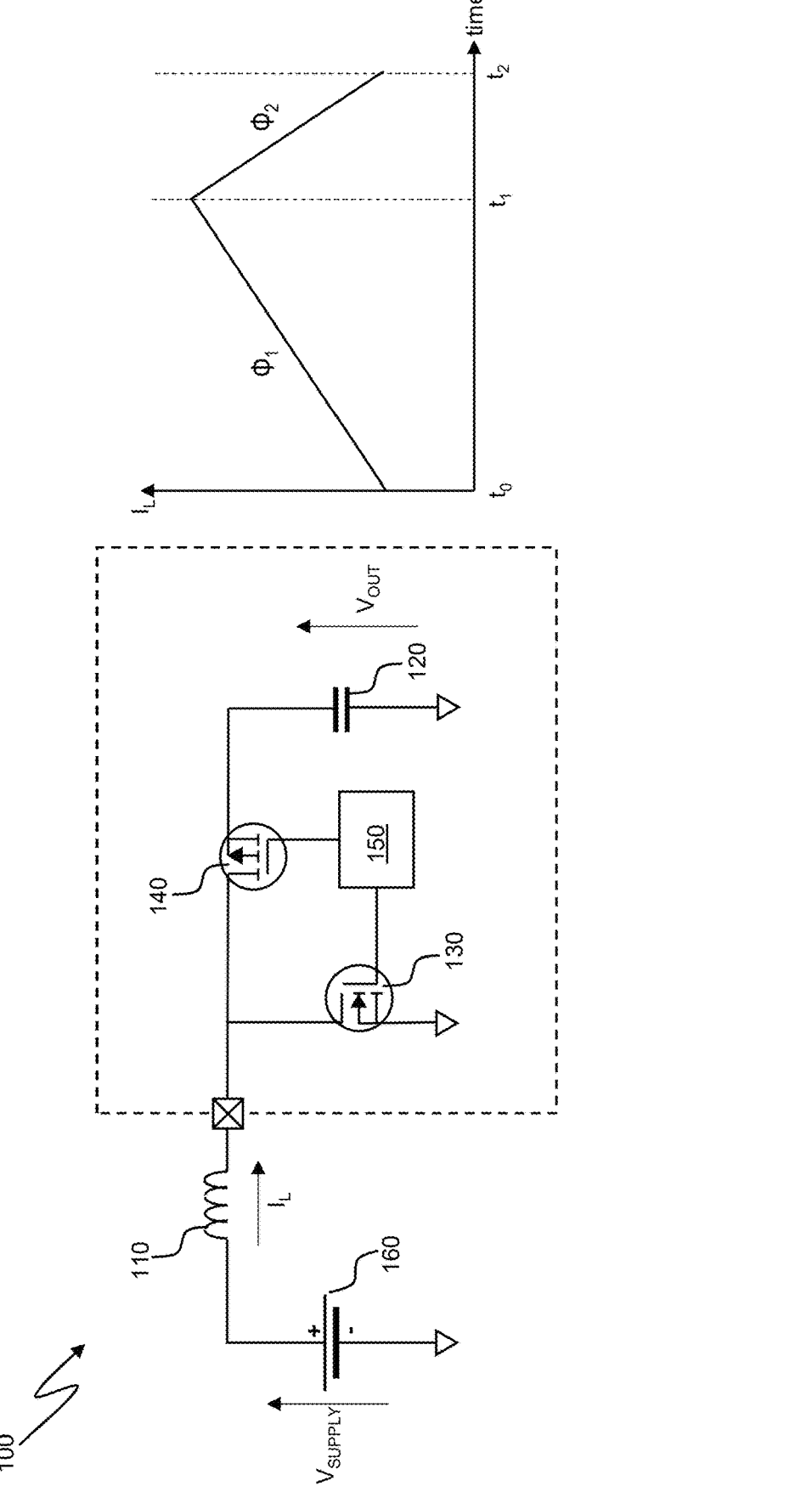
FIG. 1 is a simplified schematic representation of example boost converter circuitry and a graph illustrating current flowing through an inductor of the boost converter circuitry in operation of the boost converter circuitry.

Typically boost converter circuitry 100 of the kind shown in FIG. 1 includes a control loop that controls a relationship between the duration of the charging phase $\phi_1$ and that of the discharging phase $\phi_2$ to regulate the voltage $V_{OUT}$.

A duty cycle of the boost converter circuitry 100 can be defined as follows:

$$\text{Duty cycle} = T(\phi_1)/(T(\phi_1) + T(\phi_2)),$$

where $T(\phi_1)$ is the duration of the charging phase $\phi_1$ and $T(\phi_2)$ is the duration of the discharging phase $\phi_2$.

A boost ratio of the boost converter can be defined as follows:

$$\text{Boost ratio} = V_{OUT}/V_{SUPPLY}.$$

A relationship between the boost ratio and the duty cycle can be defined as follows:

$$\text{Duty cycle} = 1 - (1/\text{Boost ratio}).$$

These equations are valid for an ideal system in steady state operation. However, in any practical implementation of boost converter circuitry there will be losses which require the duty cycle to be larger than predicted by the above equations to achieve a desired output voltage. In addition, transient responses to line or load changes may also cause the duty cycle to change, independently of the output voltage. For example, if a load is disconnected or decoupled from the boost converter circuitry 100, the output voltage of the boost converter circuitry 100 will overshoot, requiring the control loop to reduce the duty cycle until a new steady state is achieved.

Aspects of the design of the boost converter circuitry 100 may give rise to a requirement for a minimum duty cycle or a minimum boost ratio. These may include, for example, the switching time of the switches 130, 140, control signal propagation delays, a response time of the control loop and signal settling times.

If the boost converter circuitry 100 was allowed to run in a steady state condition at or below the minimum duty cycle then it would not be able to respond to a load transient of the kind described above, and the inductor 110 would not be able to discharge, which could lead to a dangerous over-voltage or over-current condition. A margin is therefore typically built into the control loop to ensure that the duty cycle always remains above the minimum duty cycle.

Thus, the control loop is typically configured to enforce a minimum allowable boost ratio (and hence a minimum steady-state duty cycle) that may be requested by a host device that incorporates the boost converter circuitry 100.

For example, if the operating frequency of the boost converter circuitry 100 is 2 Mhz, then the cycle period (i.e.

$T(\phi_1)+T(\phi_2))$ is 500 ns. There may be a requirement that $T(\phi_1)$ is at least 40 ns every cycle, but to build in some margin to accommodate possible load transients and the like, the control loop will not set a target steady-state $T(\phi_1)$ of less than 80 ns. The target duty cycle in this example is therefore limited to a minimum of 16%, which corresponds to a boost ratio of 1.19. In practice in this example the control loop may set a minimum output voltage target (i.e. a minimum output voltage that can be requested by the host device) of $1.2 \times V_{SUPPLY}$. The minimum steady state requirement that $T(\phi_1)$ is equal to or greater than 80 ns set by the control loop will be achieved, and the absolute minimum requirement that $T(\phi_1)$ is equal to or greater than 40 ns may be achieved under transient conditions.

The boost converter circuitry 100 may be required to output a voltage of at least some minimum level irrespective of the level of the supply voltage $V_{SUPPLY}$. For example, if the boost converter circuitry 100 provides a supply voltage for amplifier circuitry that must always be able to achieve a given output signal level (e.g. 5V rms), the output voltage $V_{OUT}$ of the boost converter circuitry 100 must always remain above some requested target output voltage level $V_{targetrequested}$ (e.g. 9V) in order to support the required output signal level of the amplifier circuitry, irrespective of the level of the supply voltage $V_{SUPPLY}$.

When the supply voltage $V_{SUPPLY}$ is much less than the requested target output voltage $V_{targetrequested}$ (e.g. $V_{SUPPLY}=2V$, $V_{OUT}=9V$) the boost converter circuitry 100 is able to generate the required output voltage $V_{targetrequested}$ without any risk of violating the minimum duty cycle or minimum boost ratio requirements. For example, if the minimum boost ratio is set by the control loop to be 1.2, then the required boost ratio in this example is 9/2=4.5, which is well above the minimum boost ratio.

If the supply voltage $V_{SUPPLY}$ is greater than the requested target output voltage $V_{targetrequested}$ (e.g. $V_{SUPPLY}=12V$, $V_{OUT}=9V$) the boost converter circuitry 100 may operate in a bypass mode, coupling the supply voltage directly to the output of the boost converter circuitry 100, such that the load is coupled directly to the supply voltage.

When the supply voltage $V_{SUPPLY}$ is close to the requested target output voltage $V_{targetrequested}$, there is a risk that the minimum duty cycle or minimum boost ratio requirement will be violated. For example, if the boost converter circuitry 100 has a requirement for a minimum boost ratio of 1.2, and the minimum level of the output voltage $V_{OUT}$ is 9V, then if the supply voltage $V_{SUPPLY}$ is greater than 7.5V, the boost ratio will drop below 1.2. As noted above, this could lead to a dangerous overvoltage or overcurrent condition.

Thus there is a need for a way to prevent a minimum boost ratio or minimum duty cycle from being violated in boost converter circuitry.

Figure 2:
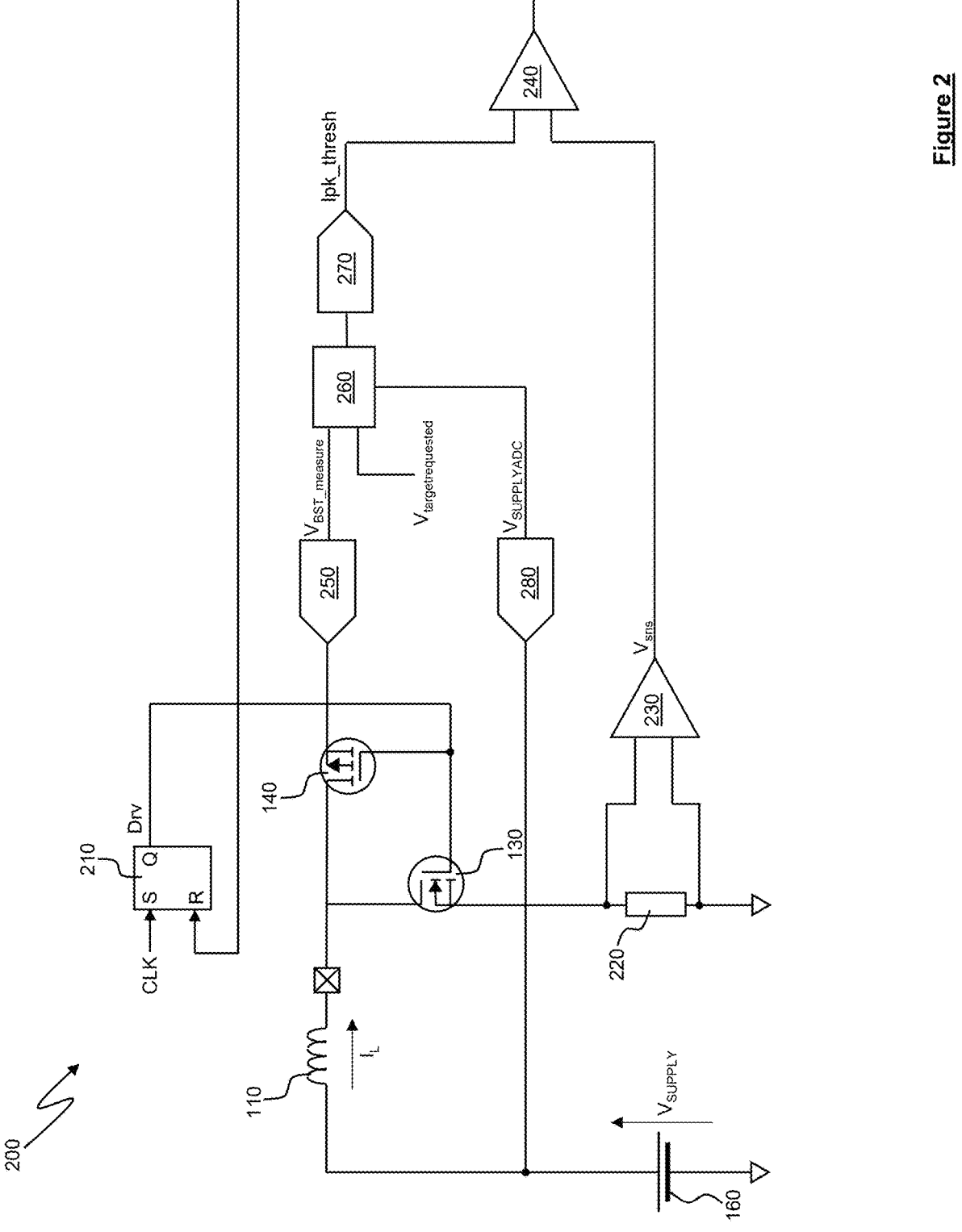
FIG. 2 is a schematic representation of power converter circuitry according to the present disclosure.

FIG. 2 is a schematic representation of example boost converter circuitry according to the present disclosure.

The boost converter circuitry, shown generally at 200 in FIG. 2, includes a number of elements in common with the boost converter circuitry 100 of FIG. 1. Such common elements are denoted by common reference numerals and will not be described again here. Furthermore, in FIG. 2 and subsequent figures, where appropriate, the reservoir capacitor 120 is not shown, for reasons of clarity and brevity.

The boost converter circuitry 200 includes controller circuitry 210 for controlling the operation of the first and second switches 130, 140. In the example shown in FIG. 2 the controller circuitry 210 comprises SR flip flop circuitry having a set(S) input which receives a clock signal CLK, a reset (R) input, and an output Q which is coupled to the gate terminals of the first and second switches 130, 140 so as to provide a gate drive signal Drv to each of the first and second switches 130, 140. However, it will be appreciated by those of ordinary skill in the art that the controller circuitry 210 may be implemented in other ways. In particular, in some examples the controller circuitry 210 may be operative to control the operation of the first and second switches 130, 140 independently, by outputting a charging phase gate drive signal Drv_chg to the first switch 130 and outputting a discharging phase gate drive signal Drv_dischg (which is different from the charge gate drive signal Drv_chg) to the second switch 140.

The boost converter circuitry 200 further includes current sensing circuitry which, in the illustrated example, comprises a current sense resistance 220 (e.g. a resistor) and amplifier circuitry 230. Those of ordinary skill in the art will appreciate that other implementations of current sensing circuitry are possible.

The current sense resistance 220 is coupled between a source terminal of the first switch 130 of the boost converter circuitry 100 and a ground or other reference voltage supply. First and second inputs of the amplifier circuitry 230 are coupled to first and second terminals of the current sense resistance 220, and the amplifier circuitry 230 thus generates an output signal $V_{sns}$ indicative of an instantaneous current through the inductor 110 when the first switch 130 is turned on. An output of the amplifier circuitry 230 is coupled to a first input of comparator circuitry 240.

The boost converter circuitry 200 further includes analog to digital converter (ADC) circuitry 250 having an input coupled to the source terminal of the second switch 140 so as to receive the output voltage of the boost converter circuitry 200. The ADC circuitry 250 thus generates a digital output signal $V_{BST\_measure}$ representing the output voltage of the boost converter circuitry 200, which is stored on the reservoir capacitor 120 (not shown in FIG. 2).

An output of the ADC circuitry 250 is coupled to a first input of digital control circuitry 260, such that the digital control circuitry 260 receives the digital output signal $V_{BST\_measure}$ generated by the ADC circuitry 250.

A second input of the digital control circuitry 260 receives a digital signal $V_{targetrequested}$ representing a requested output voltage of the boost converter circuitry 200, which may be, for example, an output voltage requested by a host device incorporating the boost converter circuitry 200.

The digital control circuitry 260 is operative to compare $V_{BST\_measure}$ to $V_{targetrequested}$ and to output a digital signal based on this comparison.

An output of the digital control circuitry 260 is coupled to an input of digital to analog converter (DAC) circuitry 270. The DAC circuitry 270 is configured to convert the digital signal output by the digital control circuitry 260 into an analog output voltage signal Ipk_thresh, which represents a peak inductor current threshold.

An output of the DAC circuitry 270 is coupled to a second input of the comparator circuitry 240, and an output of the comparator circuitry 240 is coupled to the reset (R) input of the controller circuitry 210.

The comparator circuitry 240 is thus operative to compare the instantaneous inductor current, as represented by $V_{sns}$, to the peak inductor current threshold, as represented by Ipk_thresh, and to output a control signal to the controller circuitry 210 based on the comparison.

Figure 3:
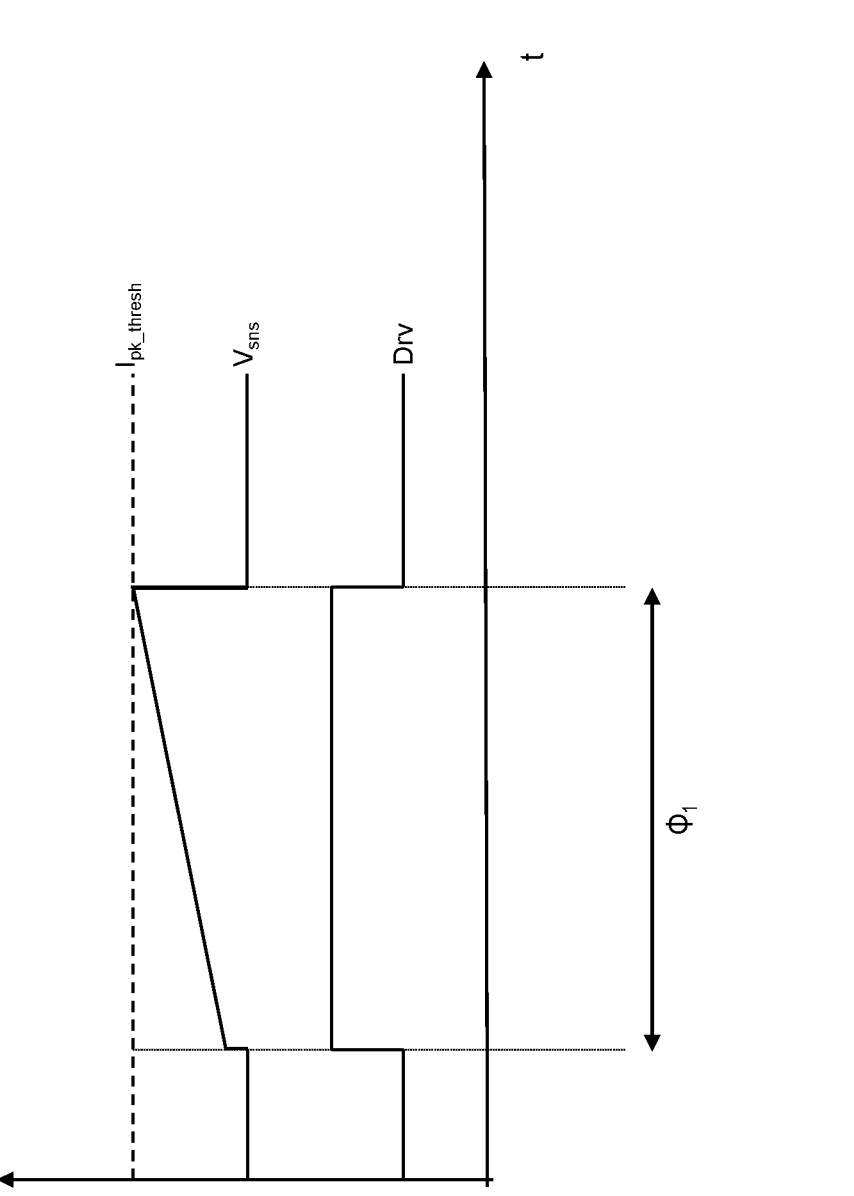
FIG. 3 is a schematic representation of signals in the power converter circuitry of FIG. 2 during operation thereof.

As shown in the signal diagram of FIG. 3, in operation of the boost converter circuitry 200, in response to a first clock pulse of the clock signal CLK received at its set(S) input, the controller circuitry 210 outputs the gate drive signal Drv to switch on the first switch 130 to cause the inductor 110 to start charging. The signal $V_{sns}$ output by the amplifier circuitry 230 increases as the inductor current increases, and is compared by the comparator circuitry 240 to the signal Ipk_thresh output by the ADC circuitry 250.

When $V_{sns}$ meets Ipk_thresh, a signal output by the comparator circuitry 240 changes from a first state (e.g. a low logic state) to a second state (e.g. a high logic state), causing the controller circuitry 210 to stop outputting the gate drive signal Drv, causing the first switch 130 to switch off and the second switch 140 to switch on, to discharge the inductor 110.

The digital control circuitry 260 compares $V_{BST\_measure}$ (which is indicative of the output voltage of the boost converter circuitry 200) to $V_{targetrequested}$, and adjusts its output signal according to this comparison. For example, if $V_{BST\_measure}$ is less than $V_{targetrequested}$, the digital control circuitry 260 increases a value of its output signal such that Ipk_thresh is also increased. This has the effect of increasing the on-time of the first switch 130 (since, for a given level of inductor current at the beginning of a charging phase $\phi_1$, the greater Ipk_thresh the longer it will take for $V_{SNS}$ to reach Ipk_thresh) and thus increasing the boost ratio of the boost converter circuitry 200. Conversely, if $V_{BST\_measure}$ is greater than $V_{targetrequested}$, the digital control circuitry 260 reduces the value of its output signal such that Ipk_thresh is also reduced, thereby reducing the on-time of the first switch 130 and thus reducing the boost ratio.

Thus the combination of the current sense circuitry (i.e. the resistance 220 and amplifier circuitry 230), comparator circuitry 240, ADC circuitry 250, digital control circuitry 260 and DAC circuitry 270 constitutes a control loop which is operative to control a duty cycle of the first switch 130 so as to regulate the output voltage of the boost converter circuitry 200 in accordance with the requested output voltage of the boost converter circuitry 200.

The boost converter circuitry 200 may be subject to a minimum duty cycle limitation or a minimum boost ratio limitation. As discussed above, when the supply voltage $V_{SUPPLY}$ is close to the requested target output voltage $V_{targetrequested}$, there is a risk that the minimum duty cycle limitation or the minimum boost ratio limitation may be violated, which could lead to a dangerous overvoltage or overcurrent condition.

To mitigate this risk, the boost converter circuitry 200 is configured to enforce a predetermined boost ratio if the supply voltage $V_{SUPPLY}$ is within a predefined threshold of the requested target output voltage $V_{targetrequested}$.

To this end, the boost converter circuitry 200 includes second ADC circuitry 280 having an input coupled to a supply terminal of the boost converter circuitry 200 at which the supply voltage $V_{SUPPLY}$ is received. An output of the second ADC circuitry 280 is coupled to an input of the digital control circuitry 260, such that the digital control circuitry 260 receives a digital signal $V_{SUPPLYADC}$ indicative of the supply voltage $V_{SUPPLY}$.

The digital control circuitry 260 is operative to determine if the supply voltage $V_{SUPPLY}$ is within the predefined threshold of the requested target output voltage $V_{targetrequested}$. If so, the digital control circuitry 260 replaces the requested target output voltage $V_{targetrequested}$ value with a new target output voltage $V_{targetactual}$, which is used in the subsequent regulation of the output voltage of the boost converter circuitry 200 to ensure that the minimum duty cycle requirement or the minimum boost ratio requirement is complied with.

For example, if the boost converter circuitry 200 is subject to a minimum duty cycle requirement that leads to a requirement for a minimum boost ratio of 1.2, and the requested target output voltage $V_{targetrequested}$ is 9V, then if the supply voltage $V_{SUPPLY}$ is greater than 7.5V (the maximum supply voltage that meet the minimum boost ratio of 1.2 when the requested target output voltage $V_{targetrequested}$ is 9V), the digital control circuitry 260 replaces the requested target output voltage $V_{targetrequested}$ value of 9V with a new, higher, target output voltage $V_{targetactual}$ at which the boost ratio meets the minimum boost ratio requirement. For example, if the new, higher, target output voltage $V_{targetactual}$ is 12V, then for a supply voltage $V_{SUPPLY}$ of 7.5V the boost ratio is 1.6, which meets the requirement for a minimum boost ratio of 1.2.

More generally, if the boost converter circuitry 200 is subject to a minimum boost ratio requirement, then when the supply voltage $V_{SUPPLY}$ reaches some threshold level, e.g. a predefined fraction or percentage of the requested target output voltage $V_{targetrequested}$, at which the minimum boost ratio requirement cannot be met, the digital control circuitry 260 replaces the requested target output voltage $V_{targetrequested}$ value with a new, higher, target output voltage $V_{targetactual}$ at which the boost ratio meets the minimum boost ratio requirement.

As will be appreciated, because the new, higher, target output voltage $V_{targetactual}$ is higher than the requested target output voltage $V_{targetrequested}$, the voltage output by the boost converter circuitry 200 may be higher than is actually required by the host device, which may lead to a reduction in the power efficiency of the host device. However, this is an acceptable compromise to prevent violation of the minimum duty cycle or minimum boost ratio requirement and the possibility of an overvoltage or overcurrent condition.

Figure 4:
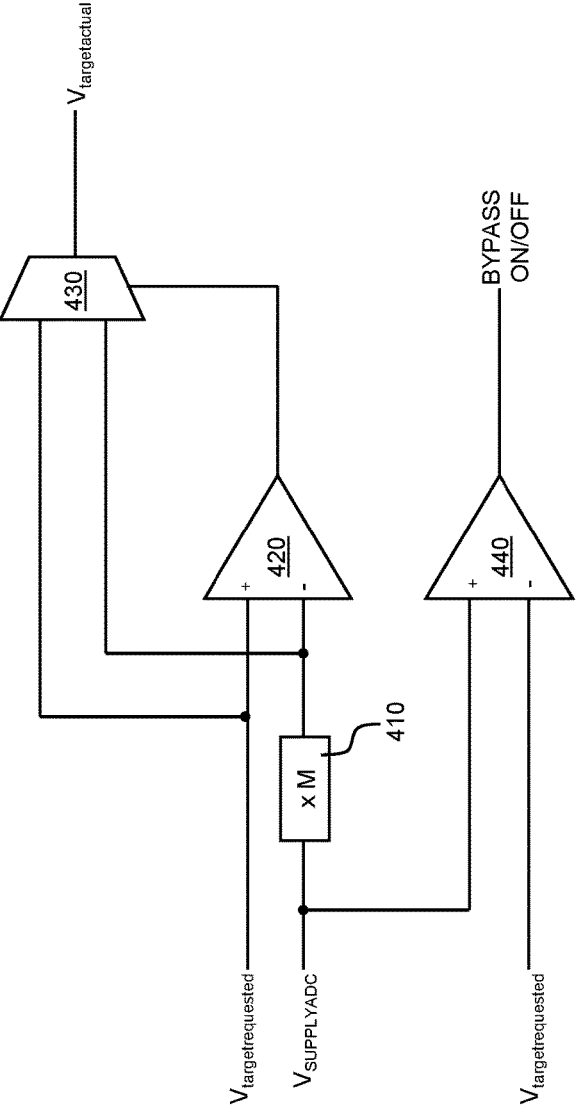
FIG. 4 is a schematic diagram illustrating one approach to enforcing a predetermined minimum boost ratio in the power converter circuitry of FIG. 2.
Figure 4:
Figure 4:

FIG. 4 is a schematic representation of functional blocks of the digital control circuitry 260 for implementing one approach to enforcing a predetermined minimum boost ratio in the boost converter circuitry 200 of FIG. 2.

As shown in FIG. 4, the digital control circuitry 260 may include functional blocks implementing digital multiplier circuitry 410, digital comparator circuitry 420 and digital multiplexer circuitry 430.

The digital multiplier circuitry 410 is configured to receive the digital signal $V_{SUPPLYADC}$ indicative of the supply voltage $V_{SUPPLY}$ and to multiply the received digital signal $V_{SUPPLYADC}$ by a multiplication factor M that is equal to the minimum boost ratio. For example, if the boost converter circuitry 200 has a requirement for a minimum boost ratio of 1.2, the multiplication factor M is equal to 1.2. An output of the digital multiplier circuitry 410 is coupled to a first, inverting, input of the digital comparator circuitry 420, such that the first input of the digital comparator circuitry 420 receives a scaled version of the digital signal $V_{SUPPLYADC}$.

A second, non-inverting input of the digital comparator circuitry 420 is configured to receive the requested target output voltage $V_{targetrequested}$.

An output of the digital comparator circuitry 420 is coupled to a control terminal of the digital multiplexer circuitry 430.

The digital multiplexer circuitry 430 is configured to receive, at a first input thereof, the requested target output voltage $V_{targetrequested}$, and at a second input thereof, the scaled version of the digital signal $V_{SUPPLYADC}$. An output signal $V_{targetactual}$ Of the digital multiplexer circuitry 430 is used (in place of the requested target output voltage $V_{targetrequested}$) by the control loop to regulate the steady state output voltage of the boost converter circuitry 200, as described above with reference to FIG. 2.

The digital multiplexer circuitry 430 is configured to select either the requested target output voltage $V_{targetrequested}$ or the scaled version of the digital signal $V_{SUPPLYADC}$ as its output signal $V_{targetactual}$, based on the signal received at its control terminal from the digital comparator circuitry 420.

Thus, the output signal $V_{targetactual}$ of the digital multiplexer circuitry 430 is equal to either $V_{targetrequested}$ or the scaled version of the digital signal $V_{SUPPLYADC}$.

The digital comparator circuitry 420 is operative to compare the scaled version of the digital signal $V_{SUPPLYADC}$ to the requested target output voltage $V_{targetrequested}$ to determine if the supply voltage $V_{SUPPLY}$ is within a predefined threshold of the requested target output voltage $V_{targetrequested}$, and thus whether there is a risk of violating a minimum duty cycle or a minimum boost ratio requirement of the boost converter circuitry 200.

In the illustrated example, if the requested target output voltage $V_{targetrequested}$ IS greater than the scaled version of the digital signal $V_{SUPPLYADC}$, this is indicative that the supply voltage $V_{SUPPLY}$ is outside the predefined threshold of the requested target output voltage $V_{targetrequested}$, and thus the requested target output voltage $V_{targetrequested}$ can be supplied by the boost converter circuitry 120 without violating the minimum duty cycle or minimum boost ratio requirements.

In this case, the output of the digital comparator circuitry 420 takes a high (e.g. logic 1) value, and the digital multiplexer circuitry 430 thus selects the requested target output voltage $V_{targetrequested}$ as its output signal $V_{targetactual}$. In this case the control loop maintains the steady state output voltage of the boost converter circuitry 200 at the requested target output voltage $V_{targetrequested}$.

In contrast, if the requested target output voltage $V_{targetrequested}$ is equal to or less than the scaled version of the digital signal $V_{SUPPLYADC}$, this is indicative that the supply voltage $V_{SUPPLY}$ is within the predefined threshold of the requested target output voltage $V_{targetrequested}$, and thus the requested target output voltage $V_{targetrequested}$ cannot be supplied by the boost converter circuitry 120 without violating the minimum duty cycle or minimum boost ratio requirements.

In this case, the output of the digital comparator circuitry 420 takes a low (e.g. logic 0) value, and the digital multiplexer circuitry 430 thus selects the scaled version of the digital signal $V_{SUPPLYADC}$ as its output signal $V_{targetactual}$. This has the effect of forcing the steady state output voltage of the boost converter circuitry 200 to adopt a value that is greater than the requested target output voltage $V_{targetrequested}$ by a margin that is sufficient to ensure compliance with the minimum boost ratio or minimum duty cycle requirement in steady state operation of the boost converter circuitry 200.

In some examples, the boost converter circuitry 200 may be operable in a bypass mode of operation, in which the output of the boost converter circuitry 200 is coupled directly to the power source 160 if the supply voltage $V_{SUPPLY}$ is greater than the requested target output voltage $V_{targetrequested}$ by a predefined margin that is sufficient to enable the power source 160 to supply the requested output voltage itself, such that boosting of the supply voltage $V_{SUPPLY}$ is not necessary.

In such examples, the digital control circuitry 260 may include second digital comparator circuitry 440, configured to receive at a first, inverting, input, the requested target output voltage $V_{targetrequested}$, and at a second, non-inverting input, the digital version $V_{SUPPLYADC}$ of the supply voltage $V_{SUPPLY}$.

If $V_{SUPPLYADC}$ is greater than $V_{targetrequested}$, an output signal BYPASS ON/OFF of the second digital comparator circuitry 440 takes a high value (e.g. logic 1), which causes the boost converter circuitry 200 to operate in its bypass mode. If $V_{SUPPLYADC}$ is less than $V_{targetrequested}$, the output signal BYPASS ON/OFF takes a low value (e.g. logic 0), which causes the boost converter circuitry 200 to operate in its normal, non-bypass mode.

To prevent toggling of the boost converter circuitry 200 between its normal (non-bypass) mode and its bypass mode, hysteresis may be applied by the second digital comparator circuitry 440, such that the output signal BYPASS ON/OFF of the second digital comparator takes the high value if $V_{SUPPLYADC}$ meets (i.e. is equal to or greater than) a first threshold (e.g. if $V_{SUPPLYADC} > V_{targetrequested} +$ some predefined margin), and takes the low value if $V_{SUPPLYADC}$ is equal to or less than a second threshold (e.g. if $V_{SUPPLYADC} \leq V_{targetrequested}$).

Figure 5:
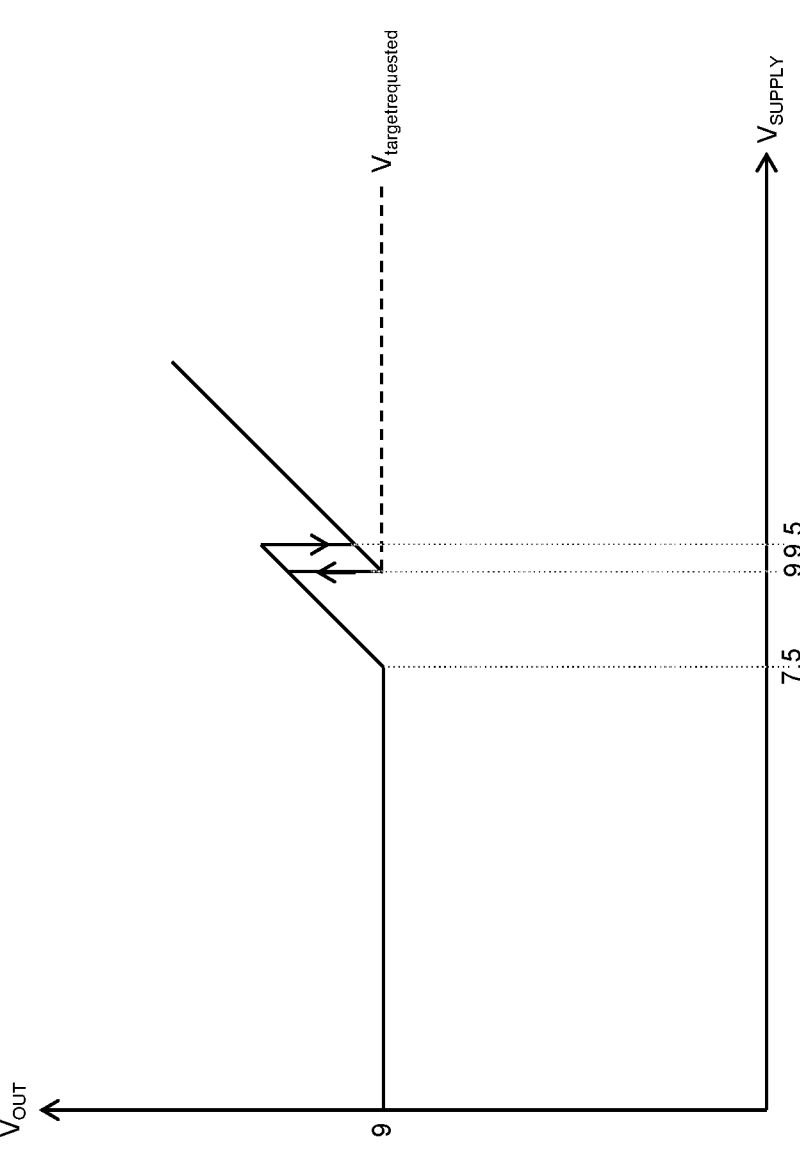
FIG. 5 is a graphical illustration of the operation of the power converter circuitry 200 of FIG. 2.

FIG. 5 is graphical illustration of the operation of the boost converter circuitry 200 of FIG. 2. The horizontal (x) axis in FIG. 5 represents the supply voltage $V_{SUPPLY}$ to the boost converter circuitry 200, and the vertical (y) axis represents the output voltage $V_{OUT}$ of the boost converter circuitry 200.

As can be seen, while the supply voltage $V_{SUPPLY}$ is outside of a predetermined threshold of the target output voltage $V_{targetrequested}$ (which in the example of FIG. 5 is 9V), the output voltage $V_{OUT}$ of the boost converter circuitry is equal to the target output voltage $V_{targetrequested}$.

When the supply voltage $V_{SUPPLY}$ reaches a level that is within a predetermined threshold (e.g. a predefined fraction or percentage) of the target output voltage $V_{targetrequested}$ (which in the example of FIG. 5 is 7.5V, corresponding to a boost ratio of 1.2, since the target output voltage $V_{targetrequested}$ of 9V is 1.2× the supply voltage $V_{SUPPLY}$ of 7.5V), the boost converter circuitry enforces a predefined minimum boost ratio (in this example 1.2) by selecting a suitable value for $V_{targetactual}$ for use by the control loop to regulate the output voltage $V_{OUT}$, such that the output voltage $V_{OUT}$ remains high enough that the boost ratio remains above a minimum value, and thus that a minimum duty cycle continues to be met.

When the supply voltage $V_{SUPPLY}$ reaches a first predefined level above the target output voltage $V_{targetrequested}$ (e.g. 9.5V in the example of FIG. 5), the boost converter circuitry 200 switches to its bypass mode of operation, and the output voltage $V_{OUT}$ follows the supply voltage $V_{SUPPLY}$. If the supply voltage subsequently drops to (or below) a second threshold (e.g. 9V) that is lower than the first threshold, the boost converter circuitry 200 reverts to operation in its normal, non-bypass mode of operation, enforcing the minimum boost ratio if necessary to maintain compliance with a minimum duty cycle requirement or a minimum boost ratio requirement of the boost converter circuitry.

In the example described above with reference to FIG. 4, the determination of whether the supply voltage $V_{SUPPLY}$ is within a predetermined threshold (e.g. a predefined fraction or percentage) of the requested target output voltage $V_{targetrequested}$ is performed by the digital control circuitry 260, but it will be appreciated by those of ordinary skill in the art that alternative approaches, e.g. using analog comparator circuitry, are also possible. Moreover, it will be appreciated that the example approach described above with reference to FIG. 4 is merely one possible way of determining whether the supply voltage $V_{SUPPLY}$ is within a predetermined threshold of the requested target output voltage $V_{targetrequested}$ and selecting an appropriate value for the new target output voltage $V_{targetactual}$ based on the result of the determination, and that other approaches that achieve the same result are possible.

As will be apparent from the foregoing, the circuitry of the present disclosure permits the enforcement of a minimum boost ratio by the boost converter circuitry 200, to ensure compliance with a minimum duty cycle requirement or a minimum boost ratio requirement of the boost converter circuitry 200, thereby reducing the risk of an overcurrent or overvoltage condition.

Figure 6:
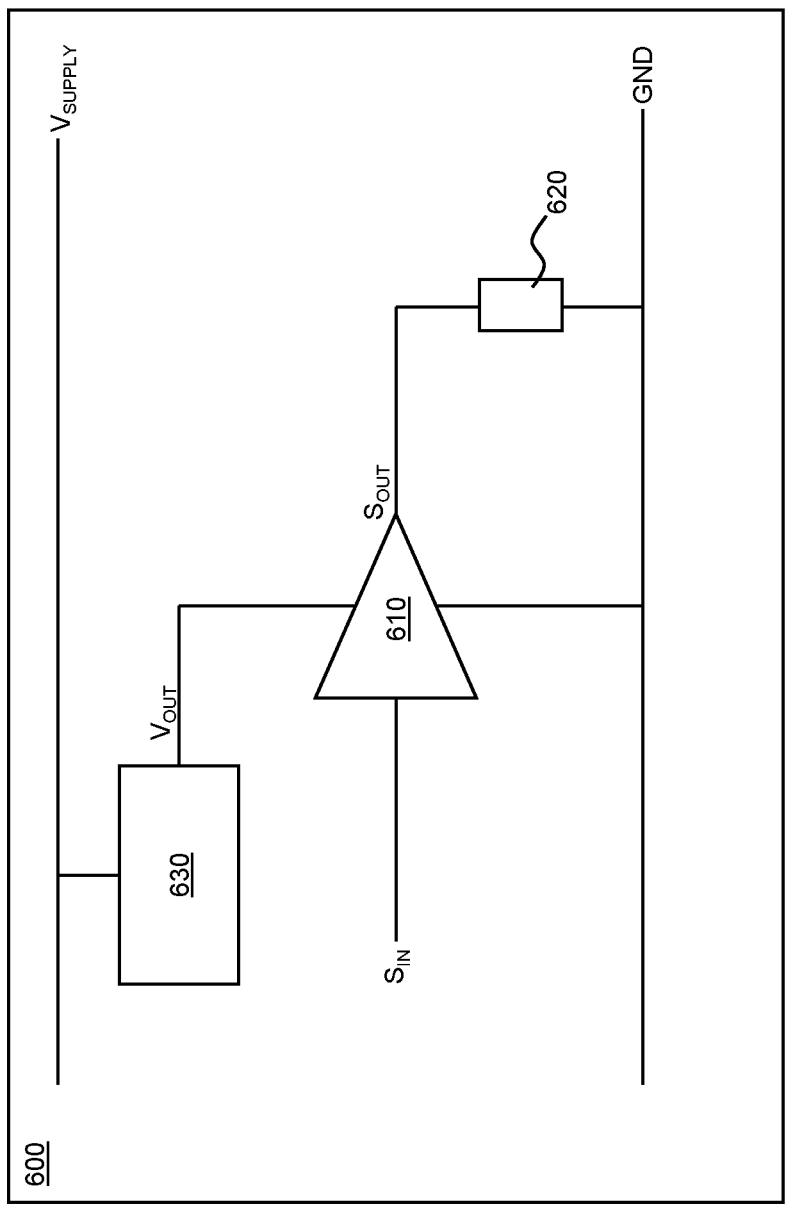
FIG. 6 is a schematic representation of an example system comprising amplifier circuitry and power converter circuitry of the kind shown in FIG. 2.

The circuitry of the present disclosure is particularly suited to providing a power supply to amplifier circuitry. FIG. 6 is a schematic representation of an example system comprising amplifier circuitry and power converter circuitry of the kind described above with reference to FIGS. 2-5. The system, shown generally at 600 in FIG. 6, thus comprises amplifier circuitry 610 configured to receive an input signal $S_{IN}$ and to output an output signal Sour to a load 620 such as a speaker, haptic actuator or other transducer. The system 600 further comprises power converter circuitry 630 of the kind described above with reference to FIGS. 2-5, operable to receive a supply voltage $V_{SUPPLY}$ from a power source such as a battery or the like, and to output a voltage $V_{OUT}$ to the amplifier circuitry 610 to support the output signal amplitude range required by the amplifier circuitry 610 with reduced risk of an overvoltage or overcurrent condition arising in the power converter circuitry 630.

The circuitry and system described above with reference to the accompanying drawings may be incorporated in a host device such as a laptop, notebook, netbook or tablet computer, a gaming device such as a games console or a controller for a games console, a virtual reality (VR) or augmented reality (AR) device, a mobile telephone, a portable audio player or some other portable device, or may be incorporated in an accessory device for use with a laptop, notebook, netbook or tablet computer, a gaming device, a VR or AR device, a mobile telephone, a portable audio player or other portable device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A system comprising:
amplifier circuitry; and
power converter circuitry for receiving a supply voltage and providing an output voltage to the amplifier circuitry, the power converter circuitry comprising:
a control loop for regulating an output voltage of the power converter circuitry in accordance with a target output voltage value; and
controller circuitry configured to adjust the target output voltage value if the supply voltage to the power converter circuitry is within a first predefined threshold of a requested output voltage of the power converter circuitry;
wherein the first predefined threshold is based on a target boost ratio value of the power converter circuitry.

2. A system according to claim 1, wherein the controller circuitry is configured to compare an indication of the requested output voltage to an indication of the supply voltage to determine if the supply voltage is within the first predefined threshold of the requested output voltage value.

3. A system according to claim 2, wherein the indication of the supply voltage comprises a scaled version of the supply voltage.

4. A system according to claim 3, wherein the controller circuitry is configured to select the scaled version of the supply voltage as the target output voltage value if the supply voltage to the power converter circuitry is within the first predefined threshold of the requested output voltage for the power converter circuitry.

5. A system according to claim 1, wherein the power converter circuitry is operable in a bypass mode in which a power source of the power converter circuitry is directly coupled to an output of the power converter circuitry.

6. A system according to claim 5, wherein the power converter circuitry is configured to operate in the bypass mode if the supply voltage is greater than a first threshold.

7. A system according to claim 6, wherein the first threshold is based on the requested output voltage and a predefined margin.

8. A system according to claim 6, wherein the power converter circuitry is configured to revert to operation in a non-bypass mode if the supply voltage is equal to or less than a second threshold, wherein the second threshold is lower than the first threshold.

9. A system according to claim 8, wherein the second threshold is equal to the requested output voltage.

10. A system according to claim 1, wherein the first predefined threshold comprises a fraction or percentage of the supply voltage.

11. A system according to claim 1, wherein the power converter circuitry comprises boost converter circuitry.

12. A system according to claim 11, wherein the boost converter circuitry is subject to a minimum duty cycle or a minimum boost ratio requirement.

13. An integrated circuit comprising a system according to claim 1.

14. A host device comprising a system according to claim 1.

15. A host device according to claim 14, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

16. Power converter circuitry comprising:
a control loop for regulating an output voltage of the power converter circuitry in accordance with a target output voltage value; and
controller circuitry configured to adjust the target output voltage value if a supply voltage to the power converter circuitry is within a first predefined threshold of a requested output voltage of the power converter circuitry;
wherein the first predefined threshold is based on a target boost ratio value of the power converter circuitry.

17. A system comprising:
amplifier circuitry; and
power converter circuitry for receiving a supply voltage and providing an output voltage to the amplifier circuitry, the power converter circuitry comprising:
a control loop for regulating an output voltage of the power converter circuitry in accordance with a target output voltage value; and
controller circuitry configured to adjust the target output voltage value if the supply voltage to the power converter circuitry is within a first predefined threshold of a requested output voltage of the power converter circuitry,
wherein the controller circuitry is configured to compare an indication of the requested output voltage to an indication of the supply voltage to determine if the supply voltage is within the first predefined threshold of the requested output voltage value,
wherein the indication of the supply voltage comprises a scaled version of the supply voltage, and
wherein the controller circuitry is configured to select the scaled version of the supply voltage as the target output voltage value if the supply voltage to the power converter circuitry is within the first predefined threshold of the requested output voltage for the power converter circuitry.

18. A system comprising:
amplifier circuitry; and
power converter circuitry for receiving a supply voltage and providing an output voltage to the amplifier circuitry, the power converter circuitry comprising:
a control loop for regulating an output voltage of the power converter circuitry in accordance with a target output voltage value; and
controller circuitry configured to adjust the target output voltage value if the supply voltage to the power converter circuitry is within a first predefined threshold of a requested output voltage of the power converter circuitry,
wherein the power converter circuitry is operable in a bypass mode in which a power source of the power converter circuitry is directly coupled to an output of the power converter circuitry,
wherein the power converter circuitry is configured to operate in the bypass mode if the supply voltage is greater than a first threshold,
wherein the power converter circuitry is configured to revert to operation in a non-bypass mode if the supply voltage is equal to or less than a second threshold, wherein the second threshold is lower than the first threshold, and wherein the second threshold is equal to the requested output voltage.

19. Power converter circuitry comprising:

a control loop for regulating an output voltage of the power converter circuitry in accordance with a target output voltage value; and controller circuitry configured to adjust the target output voltage value if a supply voltage to the power converter circuitry is within a first predefined threshold of a requested output voltage of the power converter circuitry, wherein the controller circuitry is configured to compare an indication of the requested output voltage to an indication of the supply voltage to determine if the supply voltage is within the first predefined threshold of the requested output voltage value, wherein the indication of the supply voltage comprises a scaled version of the supply voltage, and wherein the controller circuitry is configured to select the scaled version of the supply voltage as the target output voltage value if the supply voltage to the power converter circuitry is within the first predefined threshold of the requested output voltage for the power converter circuitry.

20. Power converter circuitry comprising:

a control loop for regulating an output voltage of the power converter circuitry in accordance with a target output voltage value; and controller circuitry configured to adjust the target output voltage value if a supply voltage to the power converter circuitry is within a first predefined threshold of a requested output voltage of the power converter circuitry, wherein the power converter circuitry is operable in a bypass mode in which a power source of the power converter circuitry is directly coupled to an output of the power converter circuitry, wherein the power converter circuitry is configured to operate in the bypass mode if the supply voltage is greater than a first threshold, wherein the power converter circuitry is configured to revert to operation in a non-bypass mode if the supply voltage is equal to or less than a second threshold, wherein the second threshold is lower than the first threshold, and wherein the second threshold is equal to the requested output voltage.

* * * * *